US008276150B2

(12) United States Patent
Chavoustie et al.

(10) Patent No.: US 8,276,150 B2
(45) Date of Patent: Sep. 25, 2012

(54) METHODS, SYSTEMS AND COMPUTER PROGRAM PRODUCTS FOR SPREADSHEET-BASED AUTONOMIC MANAGEMENT OF COMPUTER SYSTEMS

(75) Inventors: Michael D. Chavoustie, New Knoxville, OH (US); Andrew M. Eberbach, Seekonk, MA (US); Trevor L. Montgomery, Chapel Hill, NC (US); Joshua M. Woods, Farnhamville, IA (US)

(73) Assignee: International Business Machines Corporation, Armonk, NY (US)

( * ) Notice: Subject to any disclaimer, the term of this patent is extended or adjusted under 35 U.S.C. 154(b) by 1986 days.

(21) Appl. No.: 10/962,866

(22) Filed: Oct. 12, 2004

(65) Prior Publication Data

US 2006/0080665 A1    Apr. 13, 2006

(51) Int. Cl.
*G06F 9/46* (2006.01)
*G06F 17/00* (2006.01)
(52) U.S. Cl. .................................... 718/104; 715/212
(58) Field of Classification Search .................. 718/104; 715/212
See application file for complete search history.

(56) References Cited

U.S. PATENT DOCUMENTS

| | | | | |
|---|---|---|---|---|
| 5,293,615 | A * | 3/1994 | Amada | 1/1 |
| 6,067,412 | A * | 5/2000 | Blake et al. | 718/102 |
| 6,490,600 | B1 | 12/2002 | McGarry | 715/503 |
| 6,539,403 | B2 * | 3/2003 | Cho et al. | 707/203 |
| 6,766,509 | B1 | 7/2004 | Sheretov et al. | 717/125 |
| 7,107,519 | B1 * | 9/2006 | Webster et al. | 715/212 |
| 7,472,391 | B2 * | 12/2008 | Alcazar et al. | 718/104 |
| 2003/0018642 | A1 | 1/2003 | Bakalash et al. | 707/1 |
| 2003/0110191 | A1 * | 6/2003 | Handsaker et al. | 707/503 |
| 2003/0217079 | A1 | 11/2003 | Bakalash et al. | 707/200 |
| 2003/0225736 | A1 | 12/2003 | Bakalash et al. | 707/1 |
| 2003/0225752 | A1 | 12/2003 | Bakalash et al. | 707/3 |
| 2003/0229652 | A1 | 12/2003 | Bakalash et al. | 707/200 |
| 2004/0006765 | A1 | 1/2004 | Goldman | 717/116 |
| 2004/0103366 | A1 | 5/2004 | Peyton-Jones et al. | 715/503 |
| 2005/0149940 | A1 * | 7/2005 | Calinescu et al. | 718/104 |

* cited by examiner

*Primary Examiner* — Camquy Truong
(74) *Attorney, Agent, or Firm* — Moore & Van Allen PLLC (57) ABSTRACT

Methods, systems, and computer program products for managing a resource include using a first object to obtain data associated with the resource that is being managed. The first object may be embedded in a cell of a spreadsheet running on a spreadsheet application. Formula in the spreadsheet are executed, where at least some of the formulas reference at least some of the data obtained by the first object. The operation of the resource may then be altered based on the results of the executed formula.

25 Claims, 6 Drawing Sheets

METHODS, SYSTEMS AND COMPUTER PROGRAM PRODUCTS FOR SPREADSHEET-BASED AUTONOMIC MANAGEMENT OF COMPUTER SYSTEMS

BACKGROUND OF THE INVENTION

The present invention relates to computer systems, and more particularly, to methods and systems for the autonomic management of computer systems and/or components thereof.

Software and hardware systems such as computer servers and networks, and the applications running thereon, have grown increasingly complex with the use of distributed client/server applications, heterogeneous platforms and/or multiple protocols all on a single physical backbone. This increase in the complexity of these systems may make management of the systems more difficult. Such management may include detecting problems within the system, isolating these problems, and resolving the problem using messages and/or events generated by various components that participate in solving the problem.

Typically, various components of a system that is to be managed, including applications, middleware, hardware devices and the like, generate data that represents the status of the component. Such data may include, for example, CPU load data, concurrent user information, free disk space data, network availability information, etc. This component status data is typically consumed by a management function that monitors the system and/or performs problem analysis and resolution. The management function may, for example, be a user reading a log file or a management application that analyzes and/or displays the data.

Automatic computing management systems, which are also known as autonomic managers, refer to systems that automatically monitor other systems for situations that may require corrective action. Autonomic managers may also, in some instances, perform corrective action automatically. Autonomic managers typically include a collection of rules that determines under what situations corrective action should be initiated and the type of corrective action to apply in a particular situation. When an autonomic manager detects such a situation, the manager may, for example, alert an operator and/or self-initiate corrective procedures. Autonomic managers may be used to monitor a wide variety of software and hardware systems such as computers, applications programs, servers, and industrial systems and equipment, and may greatly expand the number of different systems and applications that an operator may be able to effectively manage. Herein, the software or hardware system that is being monitored and managed is referred to as the "managed system" or the "managed resource."

Conventional autonomic managers typically use a "MAPE" loop strategy (Monitor, Analyze, Plan and Execute) to determine the circumstances under which various corrective actions will be initiated. Under the MAPE loop strategy, metrics associated with the managed resources are monitored, analysis is then performed regarding how the monitored metrics may be used to enact policies, planning is done to avoid policy conflicts, and then the policies may be executed to implement the autonomic manager. Typically, this loop requires complex computer code and/or infrastructure. In conventional autonomic managers, the chosen policies represent the key to the control of the resource that is to be managed. Currently, policy editors are typically used as condition constructors, which may allow system administrators to, for example, generate large "if-then" statement blocks that define the way that the autonomic manager operates. Generation of the appropriate policies can be quite difficult, however, as it is often difficult to translate day-to-day maintenance and operation of the managed system into a policy format.

SUMMARY OF THE INVENTION

Embodiments of the present invention provide methods, systems and/or computer program products for autonomic management of a resource using a spreadsheet paradigm. In some embodiments, methods of automatically managing a resource are provided in which a first object is used to obtain data associated with the resource that is being managed. The first object may be embedded into a cell of a spreadsheet running on a spreadsheet application, and the data may comprise performance metrics associated with the resource that is being managed. One or more formulas in the spreadsheet are executed, where at least some of the formulas reference the data obtained by the first object. Then, based on the results of the one or more executed formulas, the operation of the resource may be altered.

In additional embodiments of the present invention, methods, systems and/or computer program products for creating an autonomic manager for a computer resource are provided. Pursuant to these methods, a first object is embedded into a cell of a spreadsheet that may be run on a spreadsheet application. The embedded first object may include one or more first routines that obtain data that is associated with the computer resource that is to be managed and a plurality of second routines that are configured to alter the operation of the computer resource. A plurality of formulas are also inserted into cells of the spreadsheet. At least one of these formulas is a conditional statement that references a cell that contains at least some of the obtained data.

As will further be appreciated by those of skill in the art, while described above primarily with reference to method aspects, the present invention may be embodied as methods, systems, autonomic managers and/or computer program products.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as a method, a data processing system, an autonomic manager running on a data processing system and/or a computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, magnetic storage devices or the like.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The computer program code may also include a commercially available spreadsheet application. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide methods, systems and/or computer program products for autonomic management of a resource using a spreadsheet paradigm. For instance, methods for autonomic management of a resource are provided in which a first object is used to obtain data associated with the resource that is being managed. Formula in a spreadsheet running on a spreadsheet application may then be executed, where at least some of the formulas reference the data obtained by the first object. The operation of the resource may then be altered based on the results of the executed formula.

In some embodiments, the first object is embedded in a cell of the spreadsheet. The data may comprise, for example, metrics such as performance metrics associated with the resource that is being managed. The operation of the resource may, in some embodiments, be automatically altered based on the results of the executed formula. The spreadsheet application may also run the spreadsheet separately as a background process that is independent of the display interface on the spreadsheet application using, for example, a J2 spreadsheet application.

In certain embodiments, the embedded first object may obtain the data on a periodic basis. Moreover, the formulas in the spreadsheet may be automatically executed by the spreadsheet application. This automatic execution may occur on a periodic or non-periodic basis. The step of altering the operation of the resource based on the results of the executed formula may be implemented by executing one or more routines associated with the first object in response to execution of the formula. The execution of these routine(s) acts to directly or indirectly alter the operation of the resource.

The first object may also be configured to change the value of a first cell in the spreadsheet in response to a call initiated by the resource that is being managed. Moreover, at least one of the formulas may comprise a conditional statement that calls for the execution of a routine associated with the first object if the first cell in the spreadsheet has a specified value. A plurality of second objects may also be embedded in the spreadsheet. These second objects accept the obtained data. A plurality of third objects that are associated with the resource that is being managed may also be provided that obtain the data associated with the resource in response to a routine run by the first object and which deliver the obtained data to respective of the plurality of second objects.

Pursuant to further embodiments of the present invention, autonomic resource managers are provided which include a spreadsheet running on a spreadsheet application. One or more first objects are embedded into one or more cells of the spreadsheet. The first objects may provide data that is associated with a resource that is being managed by the autonomic resource manager. The spreadsheet also includes a plurality of formula, at least some of which reference at least some of the data provided by the one or more first objects. In some embodiments, these formula are automatically executed by the spreadsheet application. For instance, the formula may be automatically executed in response to a detected change in the value of a cell of the spreadsheet. The autonomic manager may also include an interface between the spreadsheet and the resource that is being managed. This interface may be used to transmit the data associated with the resource that is being managed.

In certain embodiments, at least some of the formulas included in the autonomic resource manager comprise conditional statements that call for execution of one or more routines associated with at least one of the first objects if the conditional statement is satisfied. Execution of one of these routines may act to alter the operation of the resource that is being managed. The autonomic resource manager may further include a notification cell that has a data value that may be changed in response to a cal initiated by the resource that is being managed.

Pursuant to further embodiments of the present invention, computer program products for autonomic management of a resource are provided that include a computer readable medium having computer readable program code embodied therein. The computer readable program code may include computer readable program code configured to obtain data associated with the resource that is being managed, along with a spreadsheet running on a spreadsheet application. This spreadsheet may contain one or more formulas, and at least one of the formulas reference the obtained data. Finally, the computer program product may further include computer readable program code that is configured to alter the operation of the resource based on the results of the executed formula. In certain embodiments, the computer readable program code that is configured to obtain data may comprise at least one object that is embedded into a cell of the spreadsheet. The computer readable program code that is configured to alter the operation of the resource based on the results of the executed formula may comprise one or more routines associated with the object that communicate with the resource that is being managed.

Pursuant to still further embodiments of the present invention, methods of creating an autonomic manager for a computer resource are provided in which a first object is embedded in a spreadsheet that may be run on a spreadsheet application. The embedded first object may include (1) one or more first routines that, when initiated, obtain data associated with the computer resource that is to be managed and (2) one or more second routines that, when initiated, alter the operation of the computer resource. A plurality of formulas are inserted into other cells of the spreadsheet. At least one of these formulas comprises a conditional statement that references at least some of the obtained data. This formula may further call for execution of one of the one or more second routines in response to the conditional statement being satisfied.

Various embodiments of the present invention will now be described with reference to FIGS. 1 through 7. As noted above, pursuant to embodiments of the present invention, system managers may use spreadsheet programs for autonomic management of the computer system resources that are to be managed. Spreadsheets provide a familiar interface and an intuitive relationship exists between cells and the data contained therein. Most system managers are familiar with basic spreadsheet programs. Using basic spreadsheet formula and scripting capabilities, system managers can create implicit policies that can be used to manage the controlled resources without having to develop explicit policies as is typically done in conventional autonomic resource monitoring systems.

In certain embodiments of the present invention, object-oriented spreadsheets may be used such that the spreadsheet can communicate with the managed system. In such object-oriented spreadsheets, one or more cells of the spreadsheet may contain embedded objects that, among other things, obtain performance and other metric information from the managed system. The formula capability of the spreadsheet may then be used to implement policies based on the metric information received from the managed system. The results of the executed formula may then be used to implement corrective action. This corrective action may also be implemented via the one or more objects embedded into the spreadsheet. Such corrective action could include, for example, changes to the operation of the managed system, the generation of an alert to the system manager and/or the creation of an error log entry.

Figure 1:
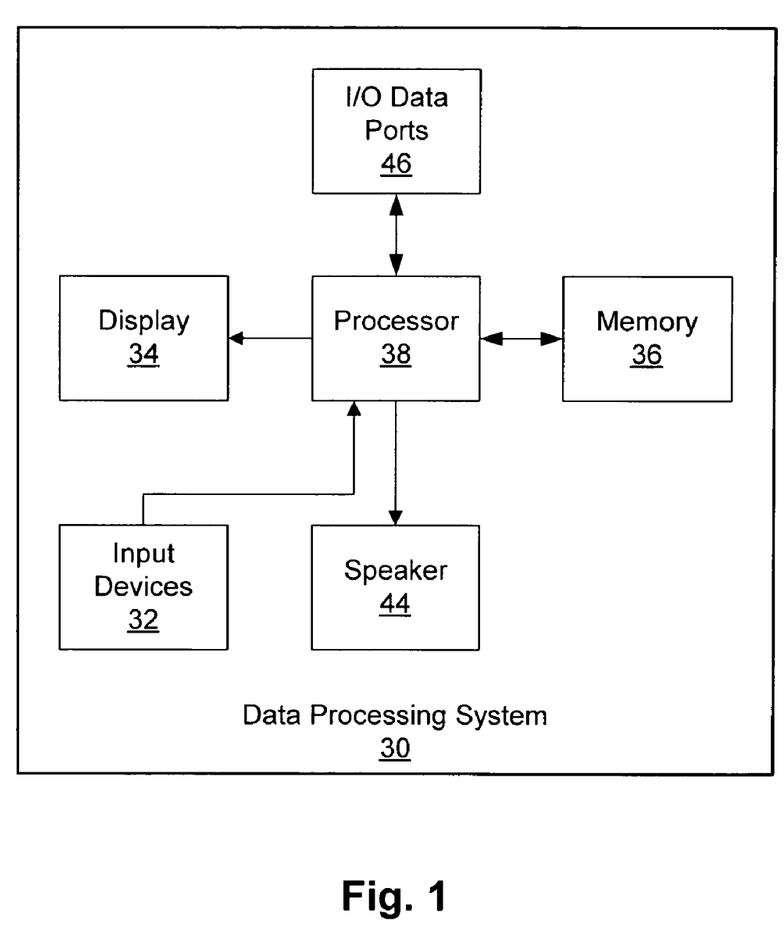
FIG. 1 is a block diagram of a data processing system suitable for use in a system according to some embodiments of the present invention.

Referring now to FIG. 1, a block diagram of data processing systems suitable for use in systems according to some embodiments of the present invention will be discussed. As illustrated in FIG. 1, an exemplary embodiment of a data processing system 30 may include input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
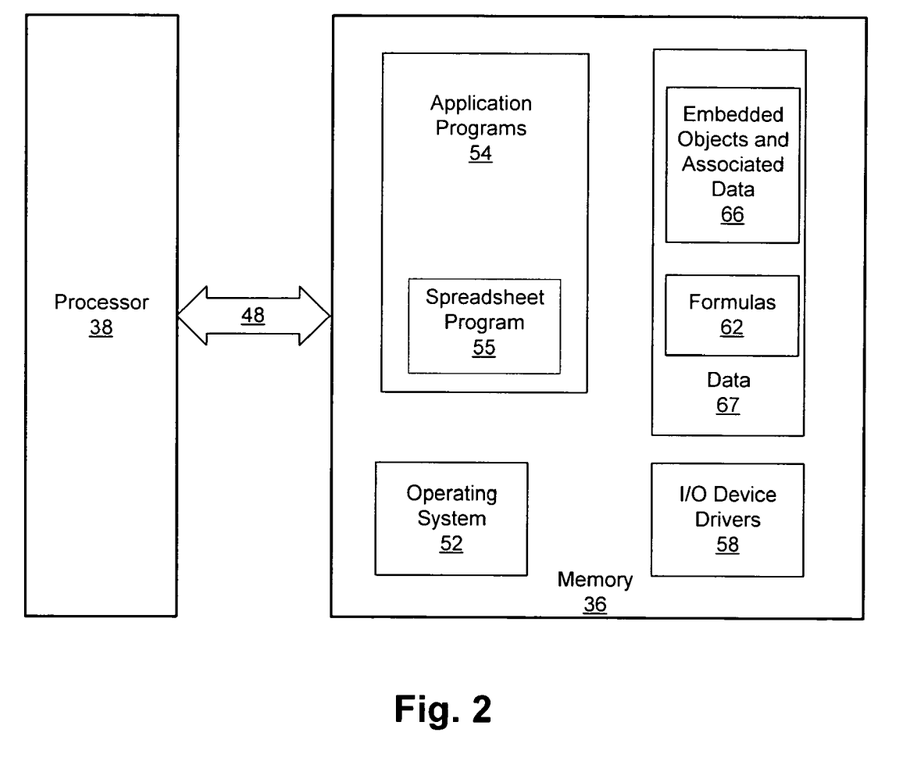
FIG. 2 is a more detailed block diagram of a data processing system for autonomic management of a resource according to further embodiments of the present invention.

FIG. 2 is a block diagram of data processing systems that illustrate systems, methods, and computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; application programs 54; input/output (I/O) device drivers 58; and data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30 and include at least one application 55 which provides spreadsheet capabilities. This application 55 may be any suitable spreadsheet application, such as, for example, Microsoft Excel, Lotus 123, J2 or the like or a custom spreadsheet application, and may also comprise a multi-purpose application that includes spreadsheet like capabilities. Finally, the data 67 represents the static and dynamic data used by the application programs 54, the operating system 52, the I/O device drivers 58, and other software programs that may reside in the memory 36. As shown in FIG. 2, this "data" may include the data obtained by objects embedded in the spreadsheet application 55.

While FIG. 2 illustrates one possible implementation of an autonomic manager according to embodiments of the present invention, it will be appreciated by those of skill in the art that other configurations may also be utilized while still benefiting from the teachings of the present invention. Thus, the present invention should not be construed as limited to the configuration of FIG. 2 but is intended to encompass any configuration capable of carrying out the operations described herein. Embodiments of the present invention may take the form of an entirely hardware embodiment, an entirely software embodiment or an embodiment combining software and hardware aspects without departing from the teachings of the present invention.

Figure 3:
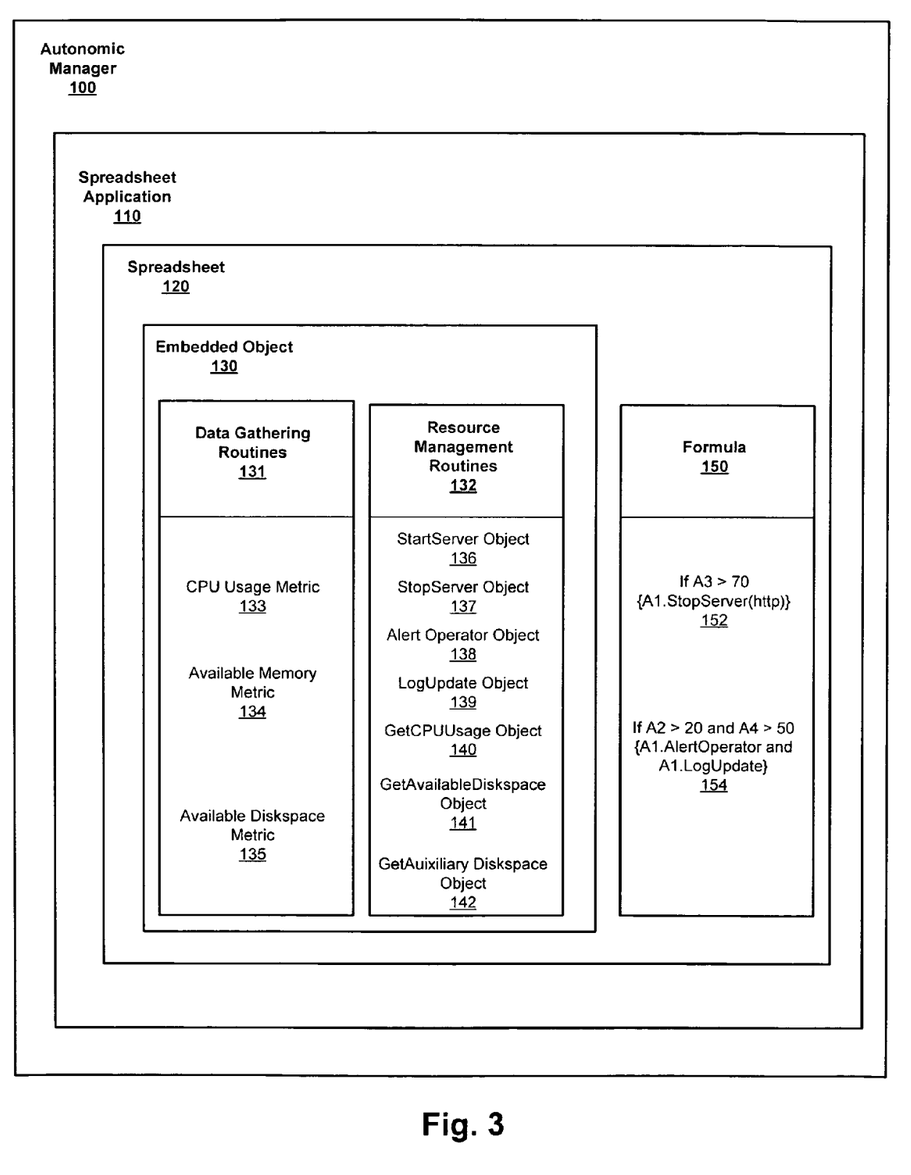
FIG. 3 is a block diagram of an autonomic manager according to some embodiments of the present invention.
Figure 4:
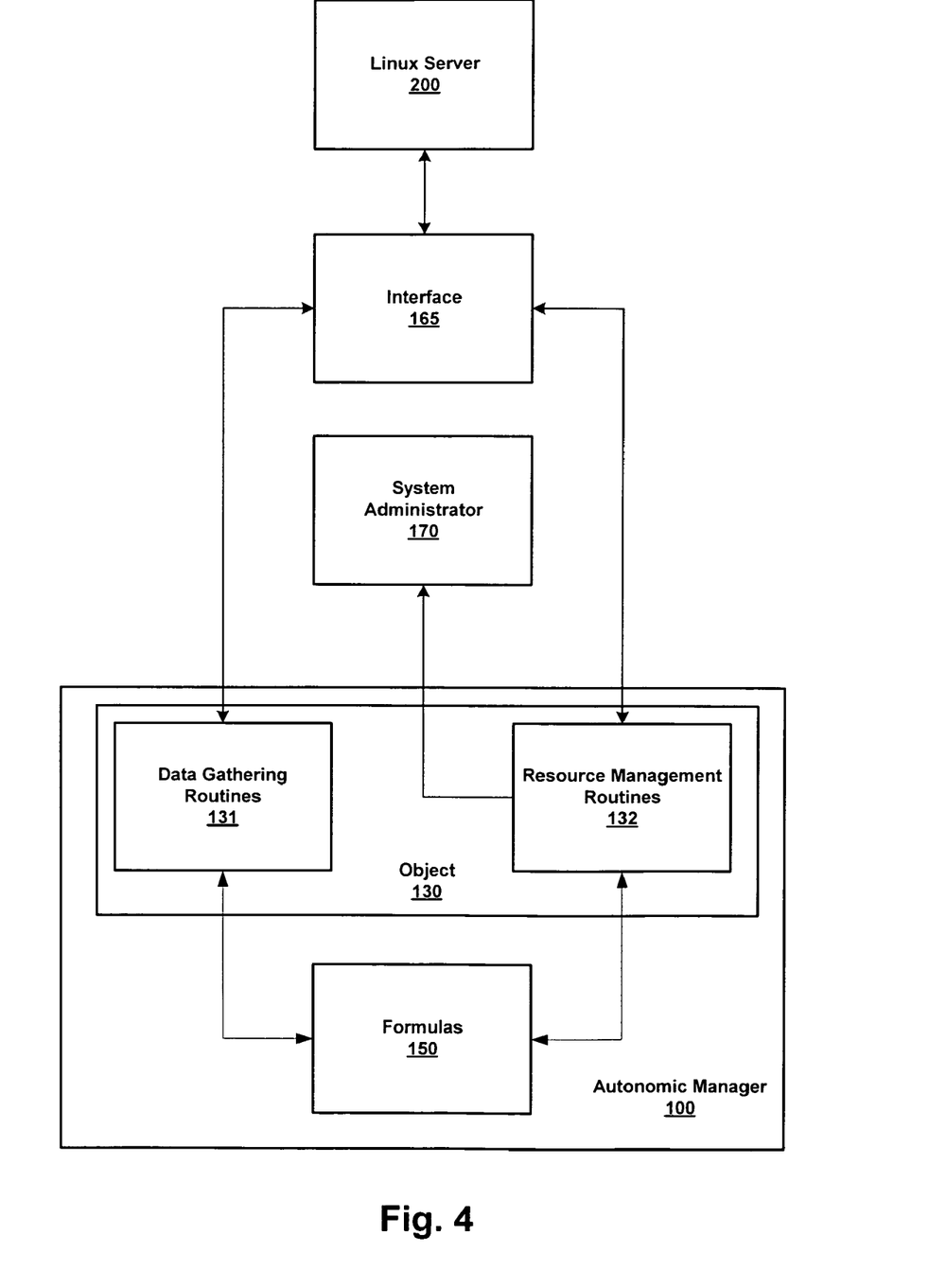
FIG. 4 is a block diagram illustrating an interface between an autonomic manager and a managed resource according to some embodiments of the present invention.

FIG. 3 is a block diagram illustrating an autonomic manager 100 according to some embodiments of the present invention. FIG. 4 is a block diagram illustrating how the autonomic manager of FIG. 3 might be used to manage another computer resource (e.g., a Linux server 200). As shown in FIG. 3, the autonomic manager 100 comprises a spreadsheet 120 running on a spreadsheet application 110. The spreadsheet 120 includes one or more embedded objects 130 and a plurality of formula 150. In embodiments of the present invention, each object 130 is embedded into a particular cell of the spreadsheet 120. Each object 130 may have one or more routines 131, 132 associated with it. These routines 131, 132 may be executed, for example, upon the satisfaction of conditional formulas 150 that are included in the spreadsheet 120. Although the examples that follow only include a single object that is embedded in the spreadsheet 120, it will be appreciated that multiple objects can be, and in many cases are embedded in the spreadsheet 120. For example, both a Linux Server object 130 and a DB2 Server object 130' might be included in an autonomic resource manager 100 according to embodiments of the present invention. Each object may be embedded in a different cell of the spreadsheet 120.

As noted above, and as shown in FIG. 3, the embedded object(s) 130 may include a plurality of associated "routines" 131, 132. Each of these routines 131, 132 may be used to perform a function, such as, for example, obtaining performance metrics or other data from the resource that is being managed or altering the operation of the managed resource in some fashion. As shown in FIG. 3, the routines 131, 132 may be divided into at least two groups. The first group, referred to as "data gathering" routines 131 in FIG. 3, refer to routines that, when executed, act (directly or indirectly) to obtain data regarding the resource that is being managed (i.e., the Linux server 200 as depicted in FIG. 4). The second group, referred to as "resource management" routines 132 in FIG. 3, refer to routines that, when executed, act to alter the operation of the resource that is being managed. The operation of the managed resource may be directly altered by the routine (e.g., the routine shuts down a server at the managed resource) or indirectly altered (e.g., the routine sends a command to the managed resource that it shut down the server or the routine sends a notification to an administrator who shuts down the server).

As shown in FIG. 3, representative data gathering routines 131 include a CPU usage call routine 133, an available memory call routine 134 and an available diskspace call routine 135. Numerous other data gathering routines 131 may also be used that provide information regarding the resource that is being managed, software running on the managed resource, peripheral hardware and/or software and the like. Representative resource management routines 132 shown in FIG. 3 include a StartServer(http) routine 152, a StopServer (http) routine 154, an AlertOperator routine 156 and a LogUpdate routine 158, GetCPUUsage routine 160, GetAvailableDiskspace routine 162 and GetAuxiliaryDiskspace routine 164. Numerous other resource management routines 132 may also be provided.

As noted above, a plurality of formulas 150 are included in the spreadsheet 120. These formulas 150 may be generated by a system manager or some other individual or computer process, or may come preprogrammed into the autonomic resource manager 100. Typically, the formulas 150 will be implemented in individual cells of the spreadsheet 120. The spreadsheet 120 is run on the spreadsheet application 110 so as to execute at least some of the formulas 150. As noted above, at least some of the formulas 150 may reference data provided by one or more of the data gathering routines 131. If the conditions specified by a particular formula are satisfied, then the spreadsheet application 110 causes the operation specified by the formula to be executed. For instance, in the example of FIG. 3, formula 152 provides that "if (A3>70) {A1.StopServer(http)}." In this example, cell A1 contains a Linux Server object that includes a plurality of routines, including a StopServer(http) resource management routine, which, when executed causes the http server on the managed resource to be shut down. Cell A3 contains "A1.getCPUUsage()" (i.e., cell A3 contains the data obtained by a data gathering routine of the Linux Server object in cell A1 that obtains the CPU usage data and inserts that data into cell A3). Thus, formula 152 indicates that if the value of cell A3 exceeds 70, which will occur if the getCPUUsage data gathering routine of the Linux Server object in cell A1 indicates a CPU usage of greater than 70%, then the StopServer (http) resource management routine of the Linux Server object in cell A1 is executed to instruct the Linux Server 200 to stop the http server running thereon.

As another example, formula 154 in the system of FIG. 3 provides that "if (A2>20 and A4>50) {A1.AlertOperator and A1.LogUpdate}." In this second example, cell A2 contains "A1.GetAvailableDiskspace" and cell A4 contains "A1.GetAuxiliaryDiskspace" (i.e., cells A2 and A4 contain the data obtained by the GetAvailableDiskspace and GetAuxiliaryDiskspace data gathering routines of the Linux Server object). Thus formula 154 indicates that if the available diskspace falls below 20 Gigabytes and the available auxiliary diskspace falls below 50 Gigabytes, then the AlertOperator resource management routine of the Linux Server object causes a notification to be sent to the system manager and the LogUpdate resource management routine of the Linux Server object causes an entry to be written to an error log.

As illustrated in FIG. 4, the autonomic manager 100 is used to manage a resource such as, for example, a Linux server 200. As noted above, the autonomic manager 100 includes one or more objects 130 that are embedded in cells of the spreadsheet 120. The managed resource (i.e., Linux server 200) generates performance metrics and/or other information that may be used in the assessment and/or management of the resource. Such information may include, for example CPU usage information, available memory, available diskspace, etc. Method calls may be made to the embedded objects 130 to execute data gathering routines 131 associated with the embedded objects 130 to obtain performance metrics and other information from the Linux server 200 (or, in certain embodiments, from another source) via an interface 165. This interface 165 may comprise any conventional interface.

As noted above, the embedded objects 130 may also have a plurality of associated resource management routines 132. When executed, these resource management routines 132 instruct or otherwise cause some action to be taken with respect to management of the resource. Representative actions are shown in FIG. 3 as items 136, 137, 138, 139, 140, 141, 142, and include starting or stopping servers or other hardware, starting or stopping applications, alerting operators, updating error logs, rebooting applications and the like. Once again, the autonomic manager 100 may use an interface such as the interface 165 in carrying out the actions specified by the resource management routines 132.

In some embodiments of the present invention, an embedded object 130 will obtain all of the information requested by each of the data gathering routines 131 before executing the formulas in the spreadsheet. Such an embodiment may simplify the design and operation of the autonomic manager 100. However, some of the data gathering routines 131 may take longer than others, and thus the operation of the autonomic manager 100 may be constrained to the operating speed of the slowest of the data gathering routines 131. Consequently, in further embodiments of the present invention, a data gathering routine 131, when initiated, may result in the creation of an intermediate object, called a "runner", that may be created, for example, by the managed resource. The runner obtains the requested data and passes the data to a "value holder" in the spreadsheet 120. The value holder is another object that is embedded into a cell in the spreadsheet that is designed to receive the data from the runner. In such an embodiment, the autonomic manager 100 may continue to run each time new data is received into a value holder within the spreadsheet.

In some embodiments of the present invention, the spreadsheet execution engine may be detached from the visible interface. In this manner, the spreadsheet application may run as a background process with the display turned off, thereby allowing the autonomic management to occur without the need for a user's input or presence. For example, the spreadsheet application may be implemented using the J2 application, which is a Java-based spreadsheet program that includes a spreadsheet engine that is independent of the spreadsheet display interface. The J2 application is capable of detecting cell value changes and acting in response to those changes without the need for user intervention and without any requirement that the changed information be displayed. As such, while the display interface may be used to define and/or edit the policies that comprise the autonomic manager by the creation and modification of formulas and the embedding of appropriate objects, the display interface need not be running during normal operation of the autonomic manager.

In embodiments of the present invention, the autonomic manager may re-execute the formulas each time a change in a cell value is detected. In other embodiments, the formulas may alternatively be executed on a periodic or non-periodic basis. In embodiments in which the formulas are executed on a periodic basis, a timer object may be embedded in a cell of the spreadsheet to initiate the periodic execution of the formulas in the spreadsheet.

In still further embodiments of the present invention, the managed resource or another entity other than the autonomic manager 100 may notify the autonomic manager 100 after the occurrence of various events. In certain embodiments of the present invention, this may be accomplished through the use of a "notification cell" in the spreadsheet. By way of example, the managed resource may be a Linux Server having an associated hard drive which fails. The Linux Server may learn that this has occurred through its own monitoring activities. Upon learning of the hard drive failure, the Linux Server sends a communication to the Linux Server object 130 embedded in the spreadsheet 120. Upon receiving this communication, the Linux Server object 130 initiates a routine that changes the value in a "notification cell" of the spreadsheet 120. This notification cell may be designed, for example, to contain one of a plurality of error codes (e.g., the notification cell may contain one of the values 1, 2, 3, 4, 5, where values of 1-4 represent the occurrence of four respective problems and a value of 5 indicates that no problems have been detected). Certain of the formulas 150 in the spreadsheet can then test the value of the notification cell and specify one or more resource management routines 132 that should be executed in the event that the error code in the notification cell indicates that a specific problem has occurred.

As discussed above, in embodiments of the present invention, at least one object may be embedded into a cell of a spreadsheet. Routines associated with this object may then be used to either (1) obtain data from the resource that is being managed or (2) directly or indirectly alter the operation of the managed resource. As will be appreciated by those of skill in the art, an "object" refers to an entity that includes associated methods or "routines" that may be performed.

As discussed above, the routines associated with the embedded objects of the present invention may be used to alter the operation of the managed resource. Such alterations include, for example, shutting down servers, restarting/rebooting equipment, switching to back-up equipment, logging off users, etc. It will also be understood that the list of alterations included herein only includes a few of the many, many different changes to the operation of a managed resource that could be performed by an autonomic manager according to embodiments of the present invention and thus are not intended to be limiting, but instead are provided so as to fully explain the general concept of the invention to those of skill in the art.

Figure 5:
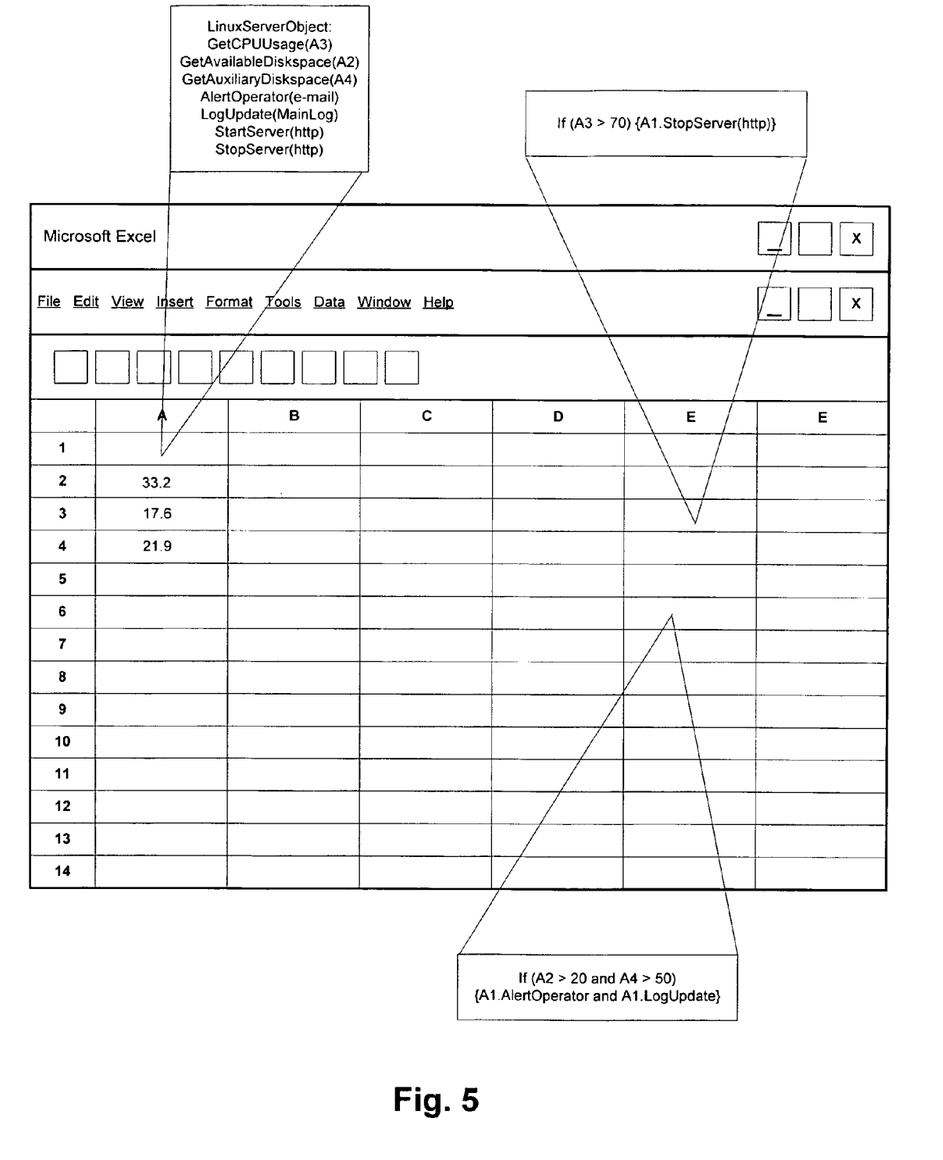
FIG. 5 is a schematic diagram of the display interface of a spreadsheet in which an autonomic manager according to some embodiments of the present invention is implemented.

FIG. 5 is a schematic diagram of the display interface of a spreadsheet that implements an autonomic manager similar to the exemplary autonomic manager 100 described above with respect to FIGS. 3 and 4. As shown in FIG. 5, in this exemplary embodiment, the autonomic manager is implemented in a Microsoft Excel spreadsheet. A Linux Server object is embedded in cell A1 of the spreadsheet. The Linux Server object includes a plurality of data gathering routines, including a GetCPUUsage routine, a GetAvailableDiskspace routine and a GetAuxiliary Diskspace routine. The information obtained by the execution of these routines is directed to cells A3, A2 and A4 of the spreadsheet, respectively. Each of these routines obtains data which reflects various performance metrics of the resource (a Linux server) that is being managed.

The Linux Server object embedded in cell A1 also contains a plurality of resource management routines, including a routine that initiates the sending of an alert to a system administrator via e-mail, a routine that initiates the sending of an entry to an error log, a routine that initiates the starting of the http server running on the Linux server and a routine that initiates the stopping of the http server. In addition, exemplary formulas are provided at cells E3 and E6 of the spreadsheet. These formulas initiate one or more of the resource management routines of the Linux Server object if a certain condition is satisfied. As these formulas are essentially identical to the formulas described above they will not be describer further here.

Figure 6:
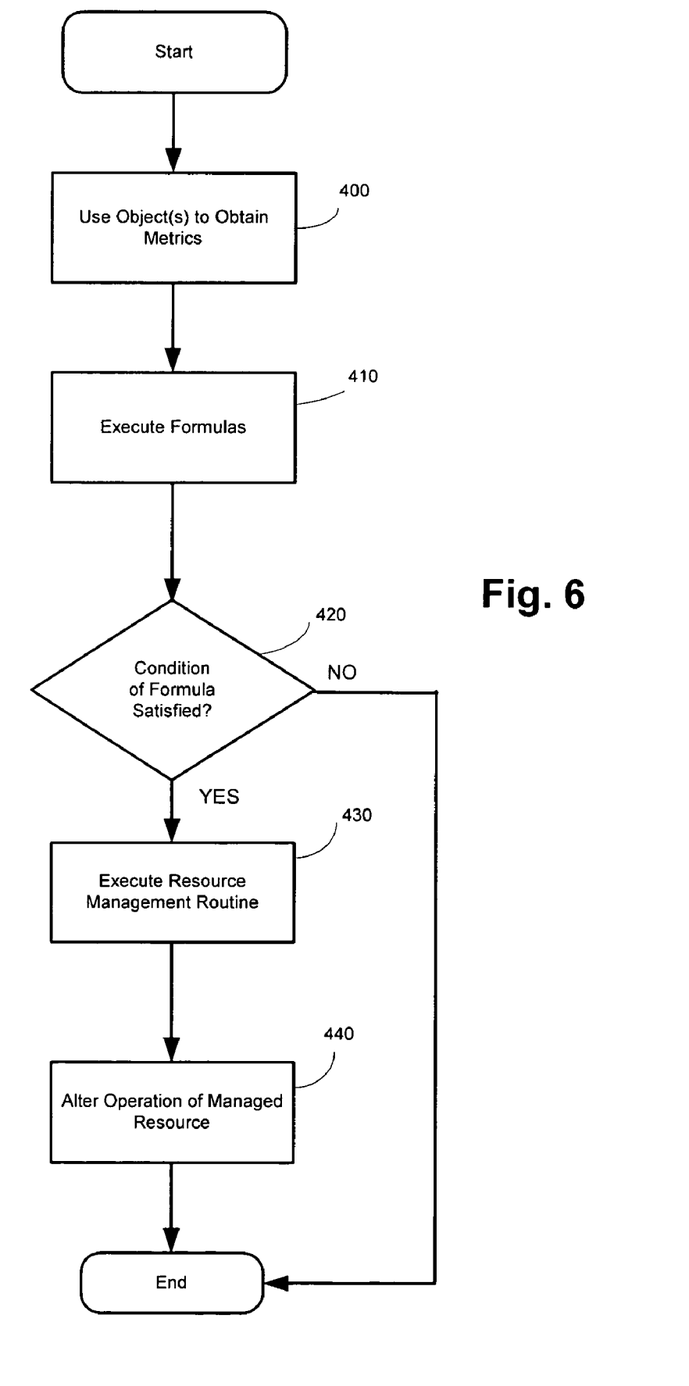
FIG. 6 is a flowchart illustrating operations for autonomic management of a resource using a spreadsheet paradigm according to some embodiments of the present invention.

FIGS. 6 is a flowchart illustrating operations for according to some embodiments of the present invention. As shown in FIG. 6, operations begin (block 400) with the autonomic manager using an embedded object (or possibly multiple embedded objects) to obtain metrics associated with the resource that is being managed. The embedded object may use data gathering routines to obtain these metrics. Formulas within the spreadsheet included in the autonomic manager are then executed (block 410). As discussed above, at least some of these formulas reference cells in the spreadsheet that include one or more of the metric data obtained by the embedded object. Upon execution, conditional statements contained in the formula may call for the execution of one or more resource management routines associated with the embedded object (block 420). If the executed formulas do not call for execution of such resource management routines, operations are completed. If, however, a resource management routine is executed (block 430), then a change is implemented in the operation of the managed resource (block 440). This change may, for example, be automatically implemented via the execution of a resource management routine such as, for example, the StopServer(http) object depicted in FIG. 3. Alternatively, the resource management routine may indirectly result in the change in the operation of the resource. For instance, the execution of the resource management routine may cause a system administrator to be notified, and then the system administrator may initiate corrective actions that result in a change in the operation of the managed resource.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A computer implemented method of managing a resource, the method comprising:
    using a first object embedded in a cell of a spreadsheet, the spreadsheet running on a spreadsheet application operating on a processor, the first object including data gathering routines adapted to obtain data associated with the resource that is being managed;
    executing one or more formulas embedded in another cell of the spreadsheet running on the spreadsheet application, wherein at least one of the one or more formulas reference the data obtained by the first object; and
    using at least one resource management routine included in the first object to alter the operation of the resource based on the results of at least one of the one or more formulas being executed, wherein the spreadsheet running on the spreadsheet application forms an autonomic manager for autonomically managing the resource,
    wherein the first object is configured to change the value of a notification cell in the spreadsheet in response to a communication from the resource that is being managed, and
    wherein at least one of the formulas embedded in another cell of the spreadsheet comprises a conditional statement that calls for the execution of the at least one resource management routine associated with the first object if the notification cell in the spreadsheet has a certain value;
    wherein a plurality of second objects are embedded into the spreadsheet that accept the obtained data.

2. The method of claim 1, wherein the data comprises metrics associated with the managed resource.

3. The method of claim 1, wherein the operation of the resource is automatically altered based on the results of the executed formula.

4. The method of claim 1, wherein the spreadsheet application runs the spreadsheet separately as a background process independent of a display interface of the spreadsheet application.

5. The method of claim 1, wherein the first object obtains data on a periodic basis.

6. The method of claim 5, further comprising a timer embedded in a cell of the spreadsheet.

7. The method of claim 1, wherein the one or more formulas in the spreadsheet are automatically executed by the spreadsheet application on a periodic basis and/or in response to a cell value change in the spreadsheet.

8. The method of claim 1, wherein altering the operation of the resource based on the results of the executed formula comprises executing one or more routines associated with the first object in response to execution of the formula, wherein the execution of the routine(s) acts to alter the operation of the resource.

9. The method of claim 1, wherein the spreadsheet application is the J2 spreadsheet application.

10. The method of claim 1, wherein at least some of the formula comprise conditional statements that call for the execution of one or more routines associated with the first object if the conditional statement is satisfied.

11. The method of claim 10, wherein execution of the one or more routines associated with the first object initiates the alteration of the operation of the resource.

12. The method of claim 1, further comprising a plurality of third objects associated with the resource that is being managed that obtain the data associated with the resource in response to a routine run by the first object and which deliver the obtained data to respective of the plurality of second objects.

13. An autonomic resource manager, comprising:
    a processor;
    a spreadsheet running on a spreadsheet application operating on the processor, the spreadsheet including:
    one or more first objects that are embedded into one or more respective cells of the spreadsheet, wherein the one or more first objects including data gathering routines to provide data associated with a resource that is being managed; and
    a plurality of formulas embedded in another cell of the spreadsheet, wherein the at least some of the plurality of formulas reference at least some of the data provided by the one or more first objects;

at least one resource management routine included in the one or more first objects to alter the operation of the resource that is being managed based on the results of at least one of the plurality of formulas being executed, wherein the spreadsheet running on the spreadsheet application forms the autonomic resource manager for autonomically managing the resource that is being managed; and an interface between the spreadsheet and the resource that is being managed over which the data is transmitted, wherein the spreadsheet includes at least one notification cell that has a data value that may be changed in response to a communication from the resource that is being managed, and wherein at least one of the plurality of formulas comprises a conditional statement that calls for the execution of the at least one resource management routine associated with one of the one or more first objects if one of the notification cells has a certain value;

wherein a plurality of second objects are embedded into the spreadsheet that accept the obtained data.

14. The autonomic resource manager of claim 13, wherein at least some of the plurality of formula execute one or more routines associated with respective of the one or more first objects in response to a condition of the formula being satisfied.

15. The autonomic resource manager of claim 14, wherein the execution of the one or more routines acts to alter the operation of the resource that is being managed.

16. The autonomic resource manager of claim 13, further comprising a plurality of second objects that are embedded into the spreadsheet that accept the data provided by the one or more first objects.

17. The autonomic resource manager of claim 13, wherein the formula are automatically executed by the spreadsheet application.

18. The autonomic resource manager of claim 13, wherein the formula are automatically executed by the spreadsheet application in response to a detected change in the value of a cell of the spreadsheet.

19. The autonomic resource manager of claim 13, wherein the spreadsheet runs on the spreadsheet application as a background process and executes the formula in response to detected changes in the values of cells of the spreadsheet.

20. The autonomic resource manager of claim 13, wherein at least some of the formula comprise conditional statements that call for the execution of one or more routines associated with at least one of the first objects if the conditional statement is satisfied.

21. A computer program product for autonomic management of a resource, comprising:

a computer readable storage device having computer readable program code embodied therein, the computer readable program code comprising:

computer readable program code configured to obtain data associated with the resource that is being managed by a spreadsheet, the spreadsheet including a first object embedded in a cell of the spreadsheet, the first object including data gathering routines adapted to obtain data associated with the resource that is being managed;

the spreadsheet running on a spreadsheet application, the spreadsheet including one or more formulas embedded in at least one other cell of the spreadsheet, wherein at least one of the formulas reference the obtained data; and computer readable program code included in the first object and configured to alter the operation of the resource based on the results of the executed one or more formulas, wherein the spreadsheet forms an autonomic manager for autonomically managing the resource, wherein the first object is configured to change the value of a notification cell in the spreadsheet in response to a call initiated by the computer resource that is being managed, and wherein at least one of the formulas embedded in another cell of the spreadsheet comprises a conditional statement that calls for the execution of a routine associated with the first object if the notification cell in the spreadsheet has a certain value;

wherein a plurality of second objects are embedded into the spreadsheet that accept the obtained data.

22. The computer program product of claim 21, wherein the computer readable program code that is configured to alter the operation of the resource based on the results of the executed formula comprises one or more routines associated with the object that communicate with the resource that is being managed.

23. A computer implemented method of creating an autonomic manager for a computer resource, the method comprising:

using a first object embedded in a cell of a spreadsheet, the spreadsheet running on a spreadsheet application operating on a processor, the first object including data gathering routines adapted to obtain data associated with the resource that is being managed;

executing one or more formulas embedded in another cell of the spreadsheet running on the spreadsheet application, wherein at least one of the one or more formulas reference the data obtained by the first object; and using at least one resource management routine included in the first object to alter the operation of the resource based on the results of at least one of the one or more formulas being executed, wherein the spreadsheet running on the spreadsheet application forms an autonomic manager for autonomically managing the resource, wherein the first object is configured to change the value of a notification cell in the spreadsheet in response to a communication from the resource that is being managed, and wherein at least one of the formulas embedded in another cell of the spreadsheet comprises a conditional statement that calls for the execution of the at least one resource management routine associated with the first object if the notification cell in the spreadsheet has a certain value;

wherein a plurality of second objects are embedded into the spreadsheet that accept the obtained data.

24. The method of claim 23, wherein the at least one of the formulas calls for execution of one of the one or more second routines in response to the conditional statement being satisfied.

25. The method of claim 24, wherein the data comprises performance metrics associated with the computer resource that is to be managed.

* * * * *